(12) United States Patent
Wakabayashi et al.

(10) Patent No.: US 12,447,615 B2
(45) Date of Patent: Oct. 21, 2025

(54) ROBOT SYSTEM, ROBOT CONTROL DEVICE, CONTROL METHOD, AND COMPUTER PROGRAM

(71) Applicant: FANUC CORPORATION, Yamanashi (JP)

(72) Inventors: Kazuki Wakabayashi, Yamanashi (JP); Toshihiro Nishimura, Yamanashi (JP); Shigeo Yoshida, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 294 days.

(21) Appl. No.: 17/996,749

(22) PCT Filed: Apr. 23, 2021

(86) PCT No.: PCT/JP2021/016423
§ 371 (c)(1),
(2) Date: Oct. 20, 2022

(87) PCT Pub. No.: WO2021/220957
PCT Pub. Date: Nov. 4, 2021

(65) Prior Publication Data
US 2023/0211499 A1    Jul. 6, 2023

(30) Foreign Application Priority Data
Apr. 28, 2020  (JP) .................. 2020-079429

(51) Int. Cl.
*G06F 17/00* (2019.01)
*B23K 37/02* (2006.01)
(Continued)

(52) U.S. Cl.
CPC ......... *B25J 9/1664* (2013.01); *B23K 37/0229* (2013.01); *G05B 19/423* (2013.01)

(58) Field of Classification Search
CPC .. B25J 9/1664; B23K 37/0229; G05B 19/423; G05B 2219/45104; G05B 19/42
(Continued)

(56) References Cited

U.S. PATENT DOCUMENTS 5,495,410 A * 2/1996 Graf .................. B25J 9/1671
                                                    700/86
5,880,956 A * 3/1999 Graf .................... G05B 19/423
                                                    700/86
(Continued)

FOREIGN PATENT DOCUMENTS

CN    102243498 A    11/2011
CN    109483096 A    3/2019
(Continued)

OTHER PUBLICATIONS

Real-Time Space Trajectory Judgment for Industrial Robots in Welding Tasks (Year: 2024) (Year: 2024).*
(Continued)

*Primary Examiner* — Ronnie M Mancho
(74) *Attorney, Agent, or Firm* — Studebaker Brackett PLLC

(57) ABSTRACT

Provided are a robot system, a robot control device, a control method, and a program which make it possible to more simply teach a robot action. The robot system comprises: a feature point teaching unit which causes a storage unit to store the position of a feature point that has been taught using lead-through; an input accepting unit which accepts the input of an angle value of a tool with respect to a workpiece W; a posture determining unit which determines the posture of the tool on the basis of the angle value of the tool; and a program generating unit which generates a robot program for a robot on the basis of the position of the feature point and the posture.

10 Claims, 7 Drawing Sheets

(51) Int. Cl.
*B25J 9/16* (2006.01)
*G05B 19/423* (2006.01)

(58) Field of Classification Search
USPC .......................................................... 700/245
See application file for complete search history.

(56) References Cited

U.S. PATENT DOCUMENTS

| | | | | |
|---|---|---|---|---|
| 6,167,328 A * | 12/2000 | Takaoka | ................. | B25J 9/1671 700/250 |
| 6,452,134 B2 * | 9/2002 | Hong | ...................... | H01L 24/78 901/42 |
| 7,209,801 B2 * | 4/2007 | Anfindsen | ............ | G05B 19/425 700/264 |
| 7,298,385 B2 * | 11/2007 | Kazi | ...................... | B25J 9/1671 700/254 |
| 7,353,082 B2 * | 4/2008 | Pretlove | ................. | G05B 19/42 700/264 |
| 7,643,907 B2 * | 1/2010 | Fuhlbrigge | ............... | G06F 8/20 700/264 |
| 7,734,358 B2 * | 6/2010 | Watanabe | ............. | G05B 19/425 318/568.25 |
| 8,103,381 B2 * | 1/2012 | Fukawa | ............. | B23K 26/0884 700/259 |
| 8,180,488 B2 * | 5/2012 | Kariyazaki | ........... | B25J 9/1676 318/568.17 |
| 9,629,523 B2 * | 4/2017 | Tesar | ................... | A61B 1/0004 |
| 9,718,189 B2 * | 8/2017 | Atohira | .................. | B25J 9/1687 |
| 9,731,419 B2 * | 8/2017 | Halsmer | ................ | B25J 9/1656 |
| 10,737,396 B2 * | 8/2020 | Rossano | ................ | B25J 11/005 |
| 10,953,543 B2 * | 3/2021 | Inoue | ..................... | B23K 26/38 |
| 11,400,594 B2 * | 8/2022 | Sun | ........................ | G06T 19/006 |
| 11,667,035 B2 * | 6/2023 | Milenkovic | ........... | B25J 9/1605 700/253 |
| 2010/0174407 A1 * | 7/2010 | Fukawa | ............. | B23K 26/0884 901/14 |
| 2010/0292843 A1 * | 11/2010 | Kariyazaki | ............ | A61B 34/30 901/46 |
| 2012/0123590 A1 * | 5/2012 | Halsmer | ................ | B25J 9/1656 901/3 |
| 2024/0342819 A1 * | 10/2024 | Smith | ...................... | B23K 9/32 |

FOREIGN PATENT DOCUMENTS

| | | | |
|---|---|---|---|
| CN | 110919639 A | 3/2020 | |
| DE | 10 2015 012 763 B4 | 6/2018 | |
| DE | 10 2019 106 360 A1 | 9/2019 | |
| EP | 1 619 567 B1 | 10/2013 | |
| EP | 1854037 B1 * | 12/2014 | ............ B25J 9/1664 |
| JP | S60-233707 A | 11/1985 | |
| JP | S63-256281 A | 10/1988 | |
| JP | H08-123536 A | 5/1996 | |
| JP | 2012-106323 A | 6/2012 | |

OTHER PUBLICATIONS

Real-Time Space Trajectory Judgment for Industrial Robots in Welding Tasks (Year: 2024).*
International Search Report issued in PCT/JP2021/016423; mailed Jun. 1, 2021.

* cited by examiner

TEACH ONLY POSITIONS BY LEAD-THROUGH TEACHING
(IN OPTIONAL POSTURE)

CHANGE ANGLE TO VALUE
INPUT VIA TEACHING OPERATION PANEL

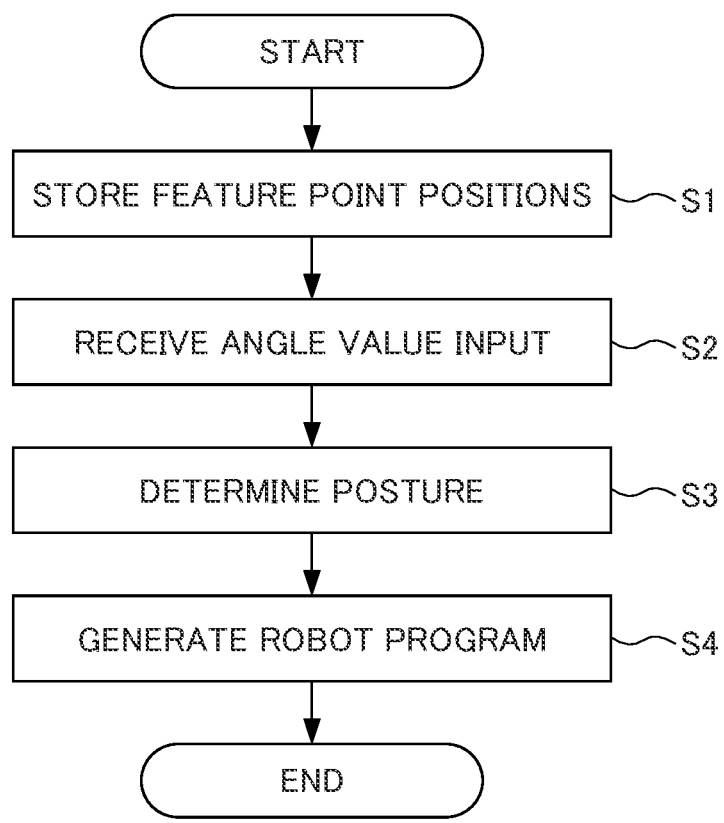

ROBOT SYSTEM, ROBOT CONTROL DEVICE, CONTROL METHOD, AND COMPUTER PROGRAM

TECHNICAL FIELD

The present invention relates to a robot system, a robot control device, a control method, and a computer program.

BACKGROUND ART

Typically, a welding robot achieves stable welding by motion of the robot, and an operator is free from sputter, fume, etc. caused upon welding. Such motion of the welding robot is taught using various techniques (see, e.g., Patent Document 1). An industrial robot described in Patent Document 1 is taught robot motion by means of lead-through teaching (also called direct teaching).
Patent Document 1: Japanese Unexamined Patent Application, Publication No.S60-233707

DISCLOSURE OF THE INVENTION

Problems to be Solved by the Invention

Such a welding robot needs to be taught motion while considering the relative positions and postures of a welding tool and a workpiece during welding. Thus, an operator requires a high level of skill for teaching motion of the welding robot. For this reason, there has been a demand for a robot system capable of more easily being taught robot motion.

Means for Solving the Problems

A robot system according to the present disclosure is a robot system for welding a workpiece by means of a motion pattern having a feature point, which includes a feature point teaching unit that stores, in a storage unit, the position of the feature point taught using lead-through teaching, an input receiving unit that receives the input of an angle value of a tool with respect to the workpiece, a posture determination unit that determines the posture of the tool based on the angle value of the tool, and a program generation unit that generates a robot program for a robot based on the position of the feature point and the posture.

A robot control device according to the present disclosure is a robot control device for welding a workpiece by means of a motion pattern having a feature point, which includes a feature point teaching unit that stores, in a storage unit, the position of the feature point taught using lead-through teaching, an input receiving unit that receives the input of an angle value of a tool with respect to the workpiece, a posture determination unit that determines the posture of the tool based on the angle value of the tool, and a program generation unit that generates a robot program for a robot based on the position of the feature point and the posture.

A control method according to the present disclosure is a robot control method for welding a workpiece by means of a motion pattern having a feature point, which includes the step of storing the position of the feature point taught using lead-through teaching, the step of receiving the input of an angle value of a tool with respect to the workpiece, the step of determining the posture of the tool based on the angle value of the tool, and the step of generating a robot program for a robot based on the position of the feature point and the posture.

A computer program according to the present disclosure is a computer program causing a computer to execute the step of storing the position of a feature point taught using lead-through teaching and forming a motion pattern, the step of receiving the input of an angle value of a tool with respect to a workpiece, the step of determining the posture of the tool based on the angle value of the tool, and the step of generating a robot program for a robot based on the position of the feature point and the posture.

Effects of the Invention

According to the present invention, it is possible to more easily teach robot motion.

BRIEF DESCRIPTION OF THE DRAWINGS

FIG. 7 is a flowchart showing the flow of processing in the robot system according to the present embodiment.

PREFERRED MODE FOR CARRYING OUT THE INVENTION

Figure 1:
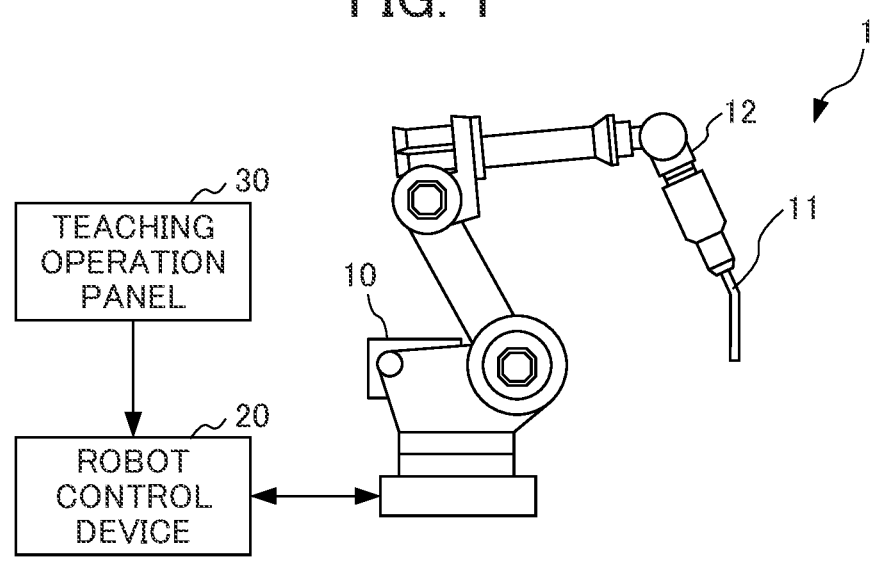
FIG. 1 is a diagram showing the outline of a robot system according to the present embodiment.

Hereinafter, an embodiment of the present invention will be described as one example. FIG. 1 is a diagram showing the outline of a robot system 1 according to the present embodiment. The robot system 1 is a system for performing arc welding by a robot 10. The robot system 1 includes the robot 10, a robot control device 20, and a teaching operation panel 30. The robot 10 moves according to control by the robot control device 20. The robot 10 is a welding robot, and includes a tool 11 and an arm 12.

The robot control device 20 is connected to the robot 10 and the teaching operation panel 30, thereby controlling motion of the robot 10. For example, the robot control device 20 controls motion of the robot 10 according to operation of the teaching operation panel 30.

The teaching operation panel 30 is connected to the robot control device 20, and is used for operating the robot 10 by an operator.

Figure 2:
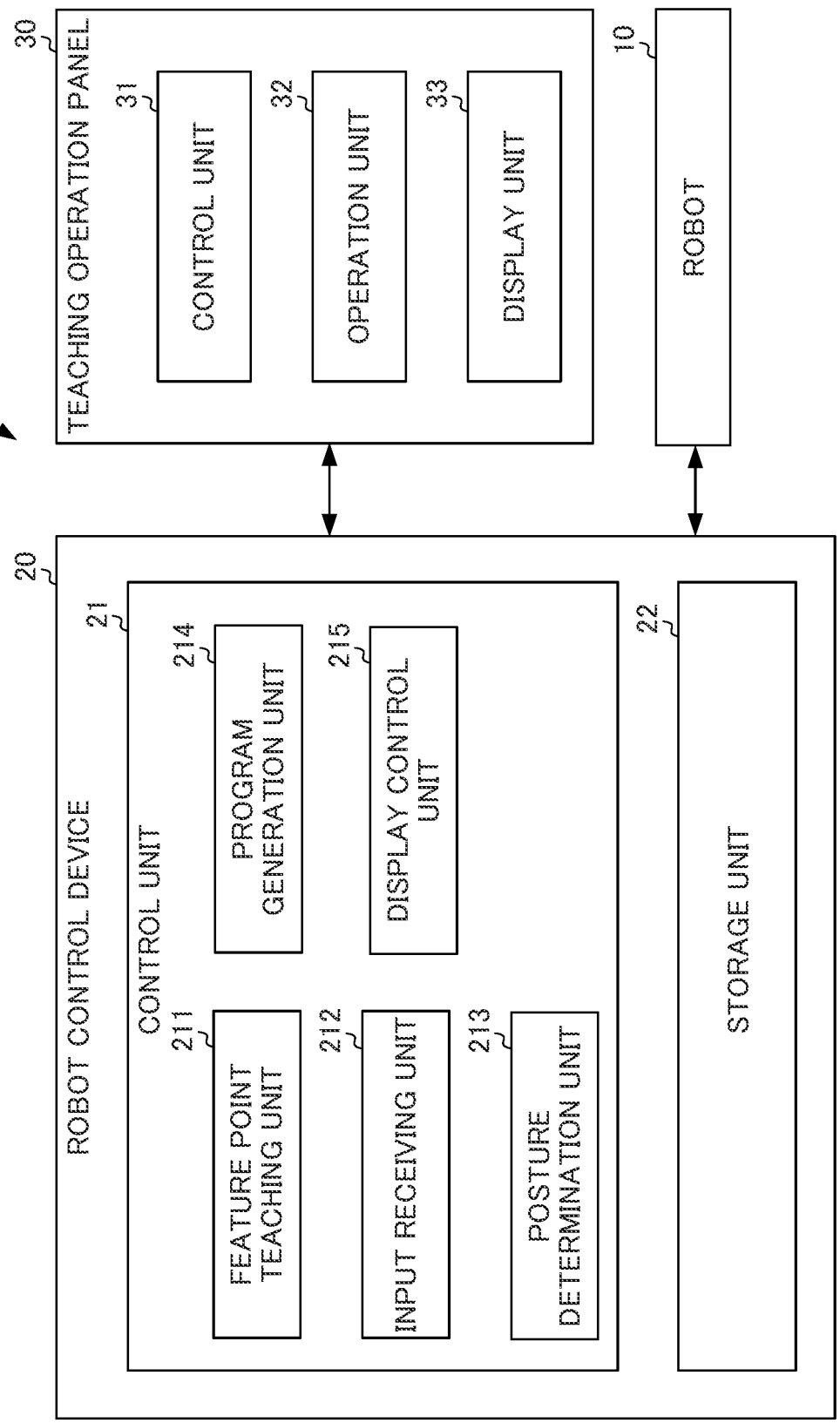
FIG. 2 is a diagram showing a functional configuration of the robot system according to the present embodiment.

FIG. 2 is a diagram showing a functional configuration of the robot system 1 according to the present embodiment. As shown in FIG. 2, the robot control device 20 includes a control unit 21 and a storage unit 22. The control unit 21 is a processor such as a central processing unit (CPU). The control unit 21 executes programs stored in the storage unit 22, thereby executing various types of processing.

The control unit 21 includes a feature point teaching unit 211, an input receiving unit 212, a posture determination unit 213, a program generation unit 214, and a display control unit 215.

The storage unit 22 is a storage device such as a read only memory (ROM) or a random access memory (RAM) storing an operating system (OS), an application program, etc. or a hard disk drive or a solid state drive (SSD) storing various other types of information.

The teaching operation panel 30 includes a control unit 31, an operation unit 32, and a display unit 33. The control unit 31 controls operation of the teaching operation panel 30, thereby executing various types of processing. The operation unit 32 includes a button, a key, a switch, etc., and receives various types of operation from the operator. The display unit 33 includes a liquid crystal display etc., and displays various types of information.

Note that the operation unit 32 and the display unit 33 may be an integrated touch panel, for example. Alternatively, the teaching operation panel 30 may include a tablet terminal.

Next, teaching of motion of the robot 10 in the robot system 1 according to the present embodiment will be described. When the operator teaches the positions of feature points forming a motion pattern by means of lead-through teaching, the feature point teaching unit 211 stores, in the storage unit 22, the positions of the feature points taught by means of the lead-through teaching. The "lead-through teaching" described herein specifically indicates the technique of moving, for teaching, the robot 10 by the operator with the operator holding the arm 12 of the robot 10.

The motion pattern of the robot 10 includes the plurality of feature points forming a straight line, an arc, etc. For example, the motion pattern may include, as the feature points, a welding start point and a welding end point.

Alternatively, the motion pattern may include at least one selected from: an offset start point in which at least one selected from a position of the tool and an angle of the tool is offset from the welding start point; and an offset end point in which at least one selected from the position of the tool and the angle of the tool is offset from the welding end point.

The motion pattern is represented by a single command block. The motion pattern includes, as a command block attribute, at least one selected from: the welding start point, the position offset from the welding start point, and the angle offset from the welding start point; an angle value of the tool 11; the welding end point, the position offset from the welding end point, and the angle offset from the welding end point; and a welding condition.

The welding condition described herein includes a current, a voltage, and a waveform (e.g., a pulse waveform and a sine wave) upon welding, the type of welding (e.g., MIG welding or MAG welding), etc. The command block is the unit of execution of a robot program, and indicates a command for a single line of the robot program.

The input receiving unit 212 receives the input of the angle value of the tool 11 with respect to a workpiece. Specifically, the input receiving unit 212 receives the input of the target angle and the advance/retreat angle of the tool 11 with respect to the workpiece. Moreover, the input receiving unit 212 receives the input of an offset distance of the tool 11. Note that these types of input are made using the teaching operation panel 30 by the operator, for example.

A method in which an arc precedes the tool (a torch) in a tool traveling direction is called herein a torch advance method, and an angle between the tool and a line perpendicular to the workpiece is a torch advance angle. On the other hand, a method in which the arc follows a wire in the tool traveling direction is called a torch retreat method, and an angle between the tool and a line perpendicular to the workpiece is a torch retreat angle.

The posture determination unit 213 determines the posture of the tool 11 based on the angle value of the tool 11. Specifically, the posture determination unit 213 takes, as a reference line, a line connecting the feature points. The posture determination unit 213 determines the angle of the tool 11 with respect to the reference line in a predetermined reference plane based on the angle value of the tool 11. The posture determination unit 213 determines the angle of the tool 11 with respect to the reference line upon motion of the robot 10.

The predetermined reference plane described herein is any one selected from a user-defined plane optionally defined by a user, the horizontal plane of the robot 10, and a plane defining the posture of the tool 11. The horizontal plane of the robot 10 may be a plane perpendicular to the vertical direction, for example. The plane defining the posture of the tool 11 may be a plane defined as an initial posture of the tool 11, for example.

The predetermined reference plane may be defined by the welding start point, the welding end point, and a point other than the welding start point and the welding end point.

The program generation unit 214 generates the robot program for the robot based on the positions of the feature points and the posture of the tool 11. That is, the robot program generated by the program generation unit 214 includes the motion pattern.

With this configuration, the robot system 1 can weld the workpiece by means of the robot program including the motion pattern. The program generation unit 214 stores the generated robot program in the storage unit 22.

Figure 3:
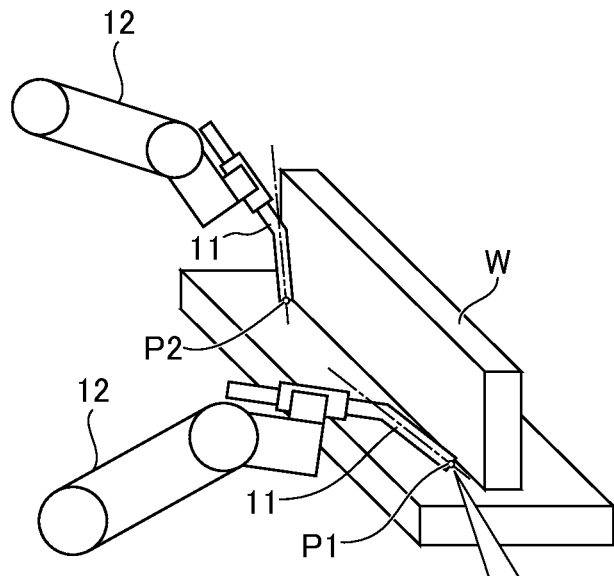
FIG. 3 is a view showing a specific example of lead-through teaching.

FIG. 3 is a view showing a specific example of the lead-through teaching. As shown in FIG. 3, the operator holds the arm 12 of the robot 10, and moves the arm 12 of the robot 10 to the position P1 of the feature point forming the motion pattern. Next, the operator moves the arm 12 of the robot 10 to the position P2 of the feature point forming the motion pattern.

Then, the feature point teaching unit 211 stores the positions P1, P2 of the feature points taught using the lead-through teaching by the operator. For example, the taught feature point position P1 is the welding start point, and the taught feature point position P2 is the welding end point.

Figure 4:
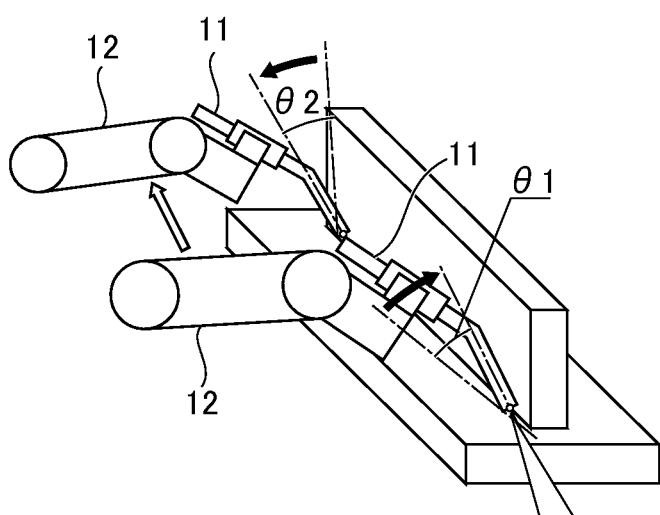
FIG. 4 is a view showing a specific example where the angle of a tool is determined by an angle value.

FIG. 4 is a view showing a specific example where the angle of the tool is determined by the angle value. As shown in FIG. 4, the posture determination unit 213 determines the angle $\theta1$ of inclination of the tool 11 in a direction toward the vertical direction with reference to the position of the tool 11 at the position P1 shown in FIG. 3 based on the angle value.

Moreover, the posture determination unit 213 determines the angle $\theta2$ of inclination of the tool 11 in a direction toward the horizontal plane of the workpiece W (a direction toward the horizontal plane perpendicular to the vertical direction) with reference to the position of the tool 11 at the position P2 shown in FIG. 3 based on the angle value.

Figure 5:
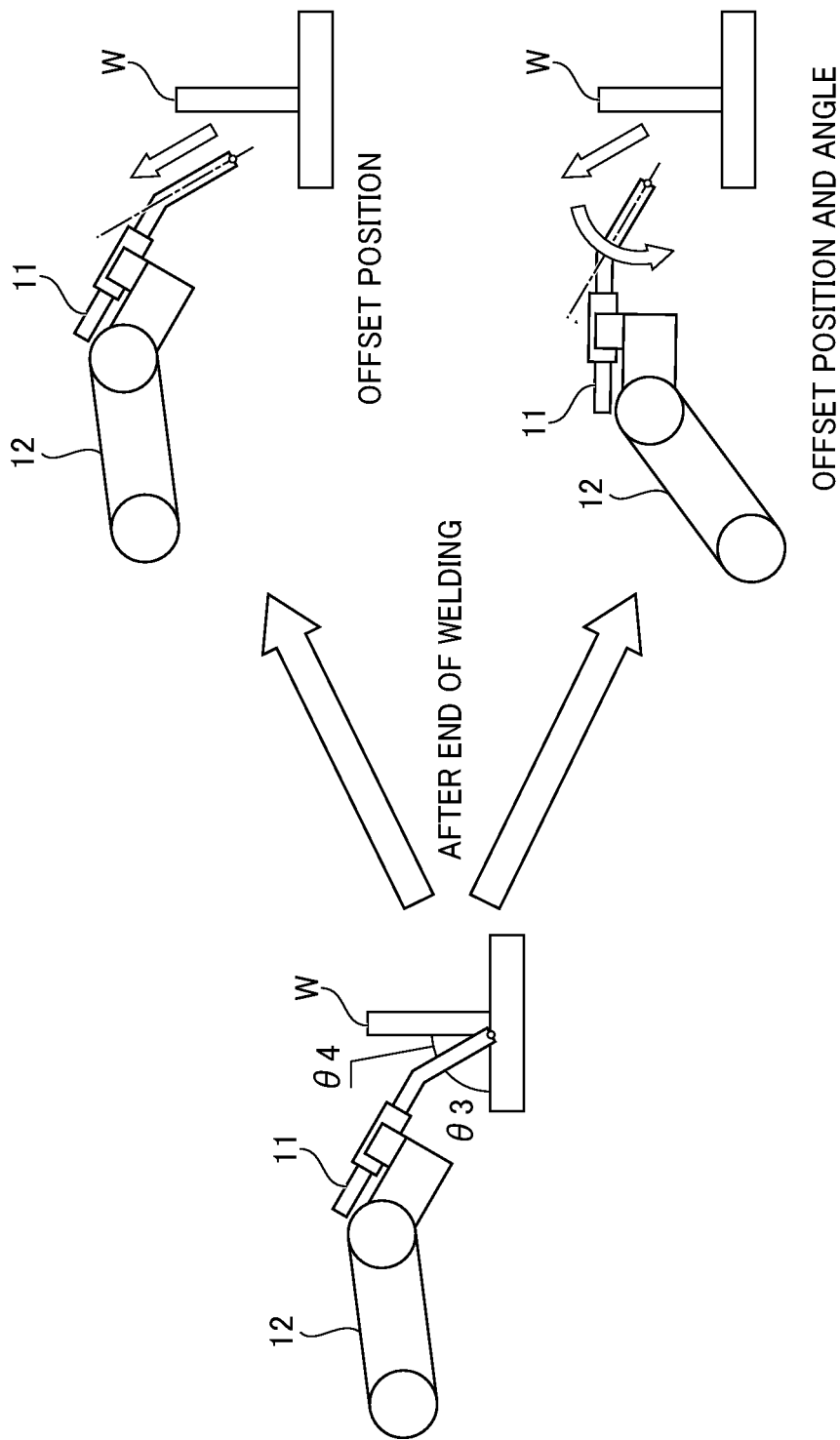
FIG. 5 is a view showing a specific example where the position and/or angle of the tool are(is) offset.

FIG. 5 is a view showing a specific example where the position and/or angle of the tool 11 are(is) offset. The target angle $\theta3$ of the tool 11 is an angle with reference to the horizontal plane of the workpiece W, and the target angle $\theta4$ of the tool 11 is an angle with reference to the vertical plane of the workpiece W.

The value of the target angle θ3, θ4 of the tool 11 is input using the teaching operation panel 30 by the operator, and is received by the input receiving unit 212. Then, the posture determination unit 213 determines the posture of the tool 11 based on the value received by the input receiving unit 212.

As shown in FIG. 5, the position of the tool 11 is offset from the taught feature point position after the end of welding. The position and angle of the tool 11 may be offset from the taught feature point position after the end of welding.

[[The]] At least one selected from the offset position and the angle is input using the teaching operation panel 30 by the operator, and is received by the input receiving unit 212. Then, the posture determination unit 213 offsets at least one selected from the position of the toll 11 and the angle of the tool 11 from the taught feature point position based on at least one selected from the position received by the input receiving unit 212 and the angle received by the input receiving unit 212.

Figure 6A:
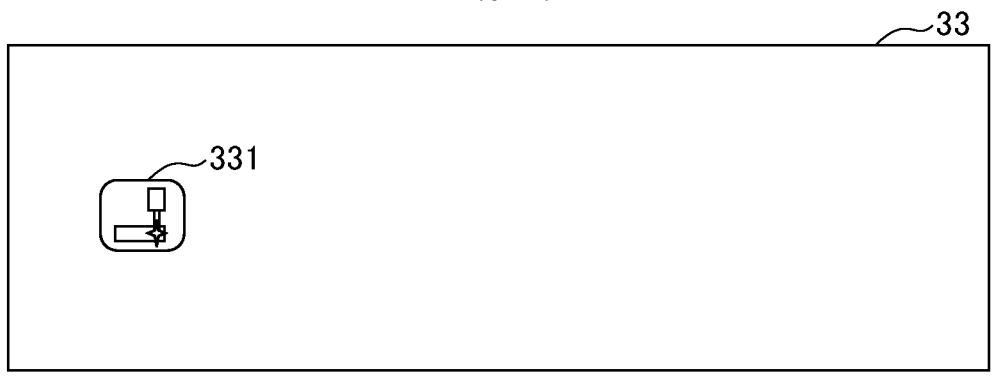
FIG. 6A is a view showing an example of indications displayed on a display unit of a teaching operation panel.

FIGS. 6A to 6D are views showing an example of indications displayed on the display unit 33 of the teaching operation panel 30. As shown in FIG. 6A, the display control unit 215 displays, on the display unit 33, a first display form 331 for teaching the motion pattern by means of the lead-through teaching. The operator selects the first display form 331 via the operation unit 32, to thereby start teaching the motion pattern.

Figure 6B:
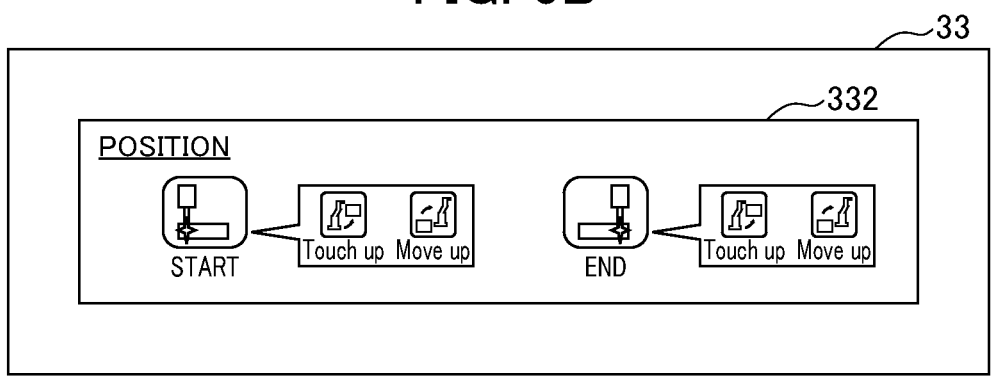
FIG. 6B is a view showing the example of the indications displayed on the display unit of the teaching operation panel.

Next, as shown in FIG. 6B, the display control unit 215 displays, on the display unit 33, a second display form 332 for teaching the welding start point and the welding end point. The operator selects an icon of "START" of the second display form 332 via the operation unit 32. Then, the operator moves the arm 12 of the robot 10 to teach the welding start point by means of the lead-through teaching, for example. Similarly, the operator may move the arm 12 of the robot 10 to teach the welding end point by means of the lead-through teaching.

Figure 6C:
FIG. 6C is a view showing the example of the indications displayed on the display unit of the teaching operation panel.

Next, as shown in FIG. 6C, the display control unit 215 displays, on the display unit 33, a third display form 333 for storing the taught welding start point. The operator selects the third display form 333 via the operation unit 32. Accordingly, the feature point teaching unit 211 stores the taught welding start point in the storage unit 22. Similarly, the display control unit 215 displays, on the display unit 33, the third display form 333 for storing the taught welding end point. The operator selects the third display form 333 via the operation unit 32. The feature point teaching unit 211 stores the taught welding end point in the storage unit 22.

Figure 6D:
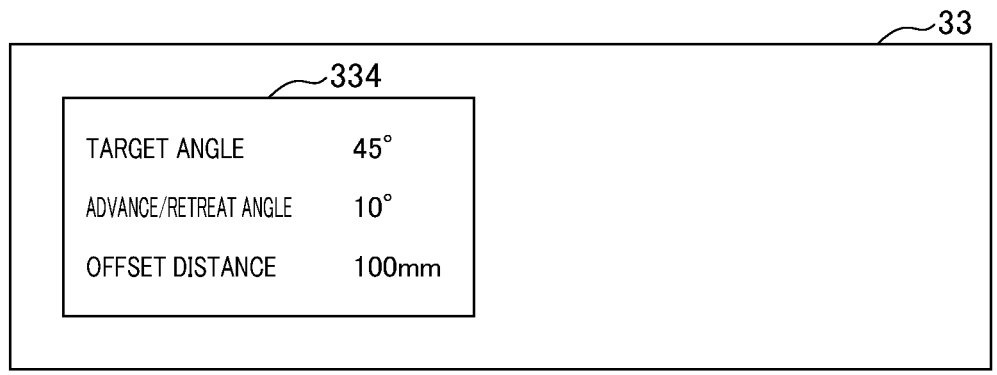
FIG. 6D is a view showing the example of the indications displayed on the display unit of the teaching operation panel.

Next, as shown in FIG. 6D, the display control unit 215 displays a fourth display form 334 for receiving the input of the advance/retreat angle of the tool 11 with respect to the workpiece. The operator inputs the angle value of the tool 11 via the operation unit 32.

The input receiving unit 212 receives the input of the target angle and advance/retreat angle of the tool 11 with respect to the workpiece. The posture determination unit 213 determines the posture of the tool 11 based on the input target angle and advance/retreat angle.

FIG. 7 is a flowchart showing the flow of processing in the robot system 1 according to the present embodiment. When the operator teaches the positions of the feature points forming the motion pattern by means of the lead-through teaching, the feature point teaching unit 211 stores, in the storage unit 22, the feature point positions taught using the lead-through teaching in Step S1.

In Step S2, the input receiving unit 212 receives the input of the angle value of the tool 11 with respect to the workpiece. In Step S3, the posture determination unit 213 determines the posture of the tool 11 based on the angle value of the tool 11.

In Step S4, the program generation unit 214 generates the robot program for the robot 10 based on the feature point positions and the posture of the tool 11.

As described above, according to the present embodiment, the robot system 1 includes the feature point teaching unit 211 that stores, in the storage unit 22, the feature point positions taught using the lead-through teaching, the input receiving unit 212 that receives the input of the angle value of the tool 11 with respect to the workpiece W, the posture determination unit 213 that determines the posture of the tool 11 based on the angle value of the tool 11, and the program generation unit 214 that generates the robot program for the robot 10 based on the feature point positions and the posture.

Since the robot system 1 is taught the feature points by means of the lead-through teaching as described above, the operator can intuitively teach the positions. Moreover, since the robot system 1 determines the posture based on the angle value, the posture of the tool 11 can be set to an angle suitable for welding.

Further, the robot system 1 can complete teaching for the robot 10 for welding only by setting the target angle and the advance/retreat angle as the angle value of the tool 11 and teaching the positions of two feature points. Thus, the robot system 1 can more easily teach motion of the robot.

The motion pattern includes the plurality of feature points forming the straight line, the arc, etc. With this configuration, the robot system 1 can define the traveling direction of the tool 11 even if the motion pattern includes a straight line or a curved line such as an arc. Thus, the robot system 1 can more easily teach motion of the robot.

The motion pattern includes at least one selected from the offset start point in which the at least one selected from the position of the tool 11 and the angle of the tool 11 is offset from the welding start point and the offset end point in which at least one selected from the position of the tool 11 and the angle of the tool 11 is offset from the welding end point. With this configuration, the robot system 1 can properly set at least one selected from the offset position of the tool 11 and the angle of the tool 11.

The motion pattern is represented by the single command block, and as the command block attribute, includes at least one selected from: the welding start point, the position offset from the welding start point, and the angle offset from the welding start point; the angle value of the tool 11; the welding end point, the position offset from the welding end point, and the angle offset from the welding end point; and the welding condition. With this configuration, the robot system 1 invokes the command block in the program so that the robot program can be more easily produced.

The posture determination unit 213 takes, as the reference line, the line connecting the feature points. Moreover, the posture determination unit 213 determines the angle of the tool 11 with respect to the reference line in the predetermined reference plane based on the angle value, and determines the angle of the tool 11 with respect to the reference line upon motion of the robot 10. With this configuration, the robot system 1 can properly determine the angle of the tool 11.

The predetermined reference plane may be any one selected from the user-defined plane optionally defined by the user, the horizontal plane of the robot 10, and the plane defining the posture of the tool 11. With this configuration, the robot system 1 can use a proper reference plane for determining the angle of the tool 11.

The predetermined reference plane may be defined by the welding start point, the welding end point, and one or more points other than the welding start point and the welding end point. With this configuration, the robot system 1 can define the reference plane without the need for defining a coordinate system of the tool 11 in advance. Moreover, the robot system 1 uses the welding start point and the welding end point so that the reference plane can be defined by less teaching points. At least one additional point is required and can be easily taught. In a case where a greater number of points is used, a more-proper plane can be defined by, e.g., averaging.

Arc welding has been mainly described in the embodiment of the present invention, but the present invention is also applicable to other welding methods such as laser welding and spot welding and other use applications such as sealing, deburring, cleaning, and coating.

The embodiment of the present invention has been described above, but the above-described robot system can be implemented by hardware, software, or a combination thereof. Moreover, the control method performed by cooperation of the components of the above-described robot system can be also implemented by hardware, software, or a combination thereof. Implementation by the software as described herein means implementation by reading and execution of a program by a computer.

The program can be stored using various types of non-transitory computer readable media and be supplied to the computer. The non-transitory computer readable media include various types of tangible storage media. Examples of the non-transitory computer readable media include magnetic recording media (e.g., a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PRPM), an erasable PROM (EPROM), a flash ROM, and a random access memory (RAM)).

Each embodiment described above is a preferred embodiment of the present invention, but is not intended to limit the scope of the present invention only to each embodiment above and various changes can be made without departing from the gist of the present invention.

EXPLANATION OF REFERENCE NUMERALS

1 Robot System
10 Robot
20 Robot Control Device
30 Teaching Operation Panel
211 Feature Point Teaching Unit
212 Input Receiving Unit
213 Posture Determination Unit
214 Program Generation Unit

The invention claimed is:

1. A robot system for welding a workpiece by means of a motion pattern having a feature point, comprising:
a feature point teaching unit that stores, in a storage unit, a position of the feature point taught using lead-through teaching;
an input receiving unit that receives an input of an angle value of a tool with respect to the workpiece;
a posture determination unit that determines a posture of the tool based on the angle value of the tool;
a program generation unit that generates a robot program for a robot based on the position of the feature point and the posture; and
a display control unit displays, on a display unit of a teaching operation panel, a first user interface (UI) of a first display form for teaching the motion pattern by means of the lead-through teaching, a second UI of a second display form for teaching a welding start point and a welding end point, a third UI of a third display form for storing the taught welding start point and the welding end point, and a fourth UI of a fourth display form for receiving the input of an advance angle value or a retreat angle value of the tool with respect to the workpiece.

2. The robot system according to claim 1, wherein the feature point in the motion pattern includes a plurality of feature points.

3. The robot system according to claim 1, wherein the motion pattern includes at least one selected from: an offset start point in which at least one selected from a position of the tool and an angle of the tool is offset from a welding start point; and an offset end point in which at least one selected from the position of the tool and the angle of the tool is offset from a welding end point.

4. The robot system according to claim 1, wherein the motion pattern is represented by a single command block, and as a command block attribute, includes at least one selected from: the welding start point, the position offset from the welding start point, and the angle offset from the welding start point; the angle value of the tool; the welding end point, the position offset from the welding end point, and the angle offset from the welding end point; and a welding condition.

5. The robot system according to claim 1, wherein the posture determination unit takes, as a reference line, a line connecting the feature points, determines the angle of the tool with respect to the reference line in a predetermined reference plane based on the angle value, and determines the angle of the tool with respect to the reference line upon motion of the robot.

6. The robot system according to claim 5, wherein the predetermined reference plane is any one selected from a user-defined plane optionally defined by a user, a horizontal plane of the robot, and a plane defining the posture of the tool.

7. The robot system according to claim 5, wherein the predetermined reference plane is defined by the welding start point, the welding end point, and one or more points other than the welding start point and the welding end point.

8. A robot control device for welding a workpiece by means of a motion pattern having a feature point, comprising:
a feature point teaching unit that stores, in a storage unit, a position of the feature point taught using lead-through teaching;
an input receiving unit that receives an input of an angle value of a tool with respect to the workpiece;
a posture determination unit that determines a posture of the tool based on the angle value of the tool;
a program generation unit that generates a robot program for a robot based on the position of the feature point and the posture; and
a display control unit displays, on a display unit of a teaching operation panel, a first user interface (UI) of a first display form for teaching the motion pattern by means of the lead-through teaching, a second UI of a second display form for teaching a welding start point and a welding end point, a third UI of a third display form for storing the taught welding start point and the welding end point, and a fourth UI of a fourth display form for receiving the input of an advance angle value or a retreat angle value of the tool with respect to the workpiece.

9. A robot control method for welding a workpiece by means of a motion pattern having a feature point, comprising:
- a step of storing a position of the feature point taught using lead-through teaching;
- a step of receiving an input of an angle value of a tool with respect to the workpiece;
- a step of determining a posture of the tool based on the angle value of the tool;
- a step of generating a robot program for a robot based on the position of the feature point and the posture; and
- a step of displaying, on a display unit of a teaching operation panel, a first user interface (UI) of a first display form for teaching the motion pattern by means of the lead-through teaching, a second UI of a second display form for teaching a welding start point and a welding end point, a third UI of a third display form for storing the taught welding start point and the welding end point, and a fourth UI of a fourth display form for receiving the input of an advance angle value or a retreat angle value of the tool with respect to the workpiece.

10. A non-transitory computer-readable storage medium storing a program that is executed by a computer that comprises a processor of a robot system, the program being executable to cause the computer to perform operations comprising:
- storing a position of a feature point taught using lead-through teaching and forming a motion pattern,
- receiving an input of an angle value of a tool with respect to a workpiece,
- determining a posture of the tool based on the angle value of the tool,
- generating a robot program for a robot based on the position of the feature point and the posture; and
- displaying, on a display unit of a teaching operation panel, a first user interface (UI) of a first display form for teaching the motion pattern by means of the lead-through teaching, a second UI of a second display form for teaching a welding start point and a welding end point, a third UI of a third display form for storing the taught welding start point and the welding end point, and a fourth UI of a fourth display form for receiving the input of an advance angle value or a retreat angle value of the tool with respect to the workpiece.

* * * * *